(12) United States Patent
Jung

(10) Patent No.: US 10,608,511 B2
(45) Date of Patent: Mar. 31, 2020

(54) EMC TERMINAL GROUND STRUCTURE FOR BLDC MOTOR

(71) Applicant: Hyoseong Electric Co., Ltd., Busan (KR)

(72) Inventor: Jingeun Jung, Busan (KR)

(73) Assignee: Hyoseong Electric Co., Ltd., Busan (KR)

( * ) Notice: Subject to any disclaimer, the term of this patent is extended or adjusted under 35 U.S.C. 154(b) by 57 days.

(21) Appl. No.: 15/893,213

(22) Filed: Feb. 9, 2018

(65) Prior Publication Data

US 2019/0165655 A1    May 30, 2019

(30) Foreign Application Priority Data

Nov. 27, 2017   (KR) .................. 10-2017-0159274

(51) Int. Cl.
*H02K 11/40*       (2016.01)
*H02K 5/173*       (2006.01)
*H02K 9/22*        (2006.01)
*H02K 7/08*        (2006.01)
*H02K 5/22*        (2006.01)
*H02K 11/33*       (2016.01)

(52) U.S. Cl.
CPC .......... *H02K 11/40* (2016.01); *H02K 5/1735* (2013.01); *H02K 5/225* (2013.01); *H02K 7/085* (2013.01); *H02K 9/22* (2013.01); *H02K 11/33* (2016.01)

(58) Field of Classification Search
CPC ........ H02K 11/40; H02K 5/225; H02K 11/33; H02K 5/1735; H02K 7/085; H02K 9/22
USPC .................................. 310/68 R, 64, 67 R, 71
See application file for complete search history.

(56) References Cited

U.S. PATENT DOCUMENTS

2016/0315524 A1*  10/2016  Ozaki ................. H02K 5/163
2018/0298908 A1*  10/2018  Capoulun ............. F04D 25/064
2019/0044422 A1*   2/2019  Suzuki .................. H02K 11/33

* cited by examiner

*Primary Examiner* — Michael Andrews
(74) *Attorney, Agent, or Firm* — Nelson Mullins Riley & Scarborough LLP; Kongsik Kim, Esq.

(57) ABSTRACT

An electromagnetic compatibility (EMC) terminal ground for a brushless direct current (BLDC) motor is disclosed. The EMC terminal ground includes a metal ground configured to be applied to the BLDC motor, the BLDC motor including: a stator block configured to include a base portion and a ball bearing reception portion; a rotor configured to be coupled to the stator block; a stator core located inside the rotor; a shaft configured to pass through the rotor and the stator core; a heat sink installed at the lower end of the stator block; and a PCB cover configured to cover the lower end portion of the heat sink; and a pair of ball bearings disposed at intervals; wherein the metal ground grounds the stator core, the rotor, and the heat sink.

5 Claims, 4 Drawing Sheets

EMC TERMINAL GROUND STRUCTURE FOR BLDC MOTOR

BACKGROUND

1. Technical Field

The present invention relates to an electromagnetic compatibility (EMC) terminal ground for a brushless direct current (BLDC) motor, which provides grounding in order to minimize RF energy (noise) which may be generated during the use of the BLDC motor and to also minimize influence resulting from surrounding RF energy.

2. Description of the Related Art

EMC is the abbreviation of electromagnetic compatibility, and refers to electromagnetic compatibility or electronic suitability in connection with electronic environmental problems. Electronic environmental problems, such as electromagnetic interference attributable to electromagnetism, etc., include many problems, which include an inter-channel mutual interference problem in a wireless communication, a frequency spectral utility problem, a ghost problem related to broadcast radio waves, erroneous operation and safety problems related to computer application devices, such as a robot system, etc., a reliability problem related to information communication networks, etc. Furthermore, the influence of electronic energy on a biological ecosystem, including humans, has become a more important EMC problem.

For example, there are many problems, such as the occurrence of a ghost generated by radio waves reflected from a high-rise building, a transmission line, a high-rise bridge tower, or the like in connection with the reception failure of television, erroneous operation attributable to traveling paging in a wireless mobile communication or urban radio wave noise in connection with an information communication network, biological hazard exerted on biological bodies including humans, etc. The concept of electromagnetic compatibility (EMC) has been developed based on research into harmonious solutions in which not only measures against a radiation source of unnecessary electronic energy but also measures to enhance immunity on a side which receives interference are taken and performed. The academic system related to this is referred to as environmental electronics.

In the past, an electronic environment was unitarily recognized as radio noise. However, as the use of electrical energy has increased, the emission of unnecessary electronic energy has increased, and thus this has been treated as an environmental problem. The Institute of Electrical and Electronics Engineers (IEEE) in the U.S. established the Group Radio Frequency Interference (GRFI) as an electromagnetic interference research expert group in 1985, and the GRFI was renamed the EMC Society thereafter and is holding international conferences every year.

Electromagnetic interference or EMI refers to a phenomenon in which electromagnetic waves directly radiated or propagated from an electric/electronic device obstruct the electromagnetic reception function of another device. EMI is the abbreviation of electromagnetic interference.

According to the definition of the International Electrotechnical Commission (IEC), "EMI is the obstruction of the reception of a desired electromagnetic signal attributable to a non-required electromagnetic signal or electromagnetic noise."

EMI, which started to attract attention from the 1930s, had been mainly dealt with within the range of radio noise interference until the 1950s. In 1958, the Group Radio Frequency Interference (GRFI) was established within the Institute of Electrical and Electronics Engineers (IEEE) as an expert group which dealt with radiated EMI directly radiated from electrical/electronic devices and conductive EMI generated along power lines.

With an explosive increase in the use of various types of electronic devices and the development of digital and semiconductor technology, the application field of precision electronic devices has become wide, and thus the electromagnetic interference caused by the devices has resulted in radio noise interference, the mutual erroneous operation of precision electronic devices, biological hazards exerted on living bodies including human bodies, etc. Accordingly, as the influence of electronic energy on biological ecosystems became a major issue, IEC established TC-77, i.e., a technical committee dealing with EMC (electromagnetic compatibility), in 1973, and TC-77 has chiefly discussed electronic environmental issues.

In particular, the influence of electromagnetic waves on the living body is serious. In the case of a thermal effect on the living body, an increase in temperature occurs due to electronic energy absorbed by the living body. In this case, the tissue or function of the living body may be damaged. Accordingly, the electromagnetic field levels considered to be safe for humans have been set by the international organizations WHO and IRPA and various countries, such as the U.S. (ANSI, NIOSH, and ACGIH), Canada, Russia, and Germany.

To put it easily, there is the concept of EMC (electromagnetic compatibility). There are electromagnetic Interference (EMI) and electromagnetic susceptibility (EMS) under the above concept.

EMC is a collective term for EMI and EMS. EMI refers to a phenomenon that adversely affects another product located around a product by RF energy noise emitted from the latter product. EMS is the opposite concept, and refers to a product's own immunity which can prevent the normal operation of the product from being affected by all RF energy and noise (static electricity, surge, or the like) present in surroundings.

As to such EMI and EMS, in Korea, related products are obliged to receive standard approval for compliance with corresponding standards from relevant departments of Korean government before sales, and are required to display approval marks for products that have received the approval. The same is true of foreign countries.

The electromagnetic interference regulations are aimed at information and communication-related products, and the electric product safety management laws target electric and electronic products.

Products approved under the regulations or the laws are marked with approval marks on the products, which can be easily seen on ID labels attached to the products.

BLDC motors must also comply with EMI and EMS standards as electronic products. An EMC performance evaluation test is a test which is requested by a person who develops, manufactures, sells, or uses an electrical or electronic product in order to receive an EMI or EMS test certificate from an accredited institution. BLDC motors must also undergo such a test in order to be certified for their product reliability and performance.

PRIOR ART DOCUMENTS

Patent Documents (Patent document 1) KR 10-2015-0146464 A
(Patent document 2) KR 10-1551066 B1
(Patent document 3) KR 10-1176983 B1

SUMMARY

Accordingly, the present invention is intended to overcome the above-described problems, and an object of the present invention is to provide an EMC terminal ground for a BLDC motor, which provides grounding in order to minimize RF energy (noise) which may be generated during the use of the BLDC motor and to also minimize influence resulting from surrounding RF energy, thereby providing the effect of ensuring the performance and stability of a product.

In order to accomplish the above object, the present invention provides an electromagnetic compatibility (EMC) terminal ground for a brushless direct current (BLDC) motor, the EMC terminal ground including a metal ground (800) configured to be applied to the BLDC motor, the BLDC motor including: a stator block (100) configured to include a base portion (110) and a ball bearing reception portion (120); a rotor (200) configured to be coupled to the stator block (100), and to be rotated; a stator core (300) located inside the rotor (200); a shaft (400) configured to pass through the centers of the rotor (200) and the stator core (300), and to transfer rotation power; a heat sink (500) installed at the lower end of the stator block (100), and configured to dissipate heat; and a PCB cover (600) configured to cover and protect the lower end portion of the heat sink 500; and a pair of ball bearings (700) disposed at intervals on upper and lower sides between the ball bearing reception portion (120) and the shaft (400); wherein the metal ground (800) grounds: the stator core (300); the rotor (200); and the heat sink (500).

The present invention provides grounding in order to minimize RF energy (noise) which may be generated during the use of the BLDC motor and to also minimize influence resulting from surrounding RF energy, thereby providing the effect of ensuring the performance and stability of a product.

DETAILED DESCRIPTION

Although embodiments of the present invention will be described with reference to the accompanying drawings, this is intended to help to facilitate an easier understanding of the present invention, and the scope of the present invention is not limited thereby.

Figure 1:
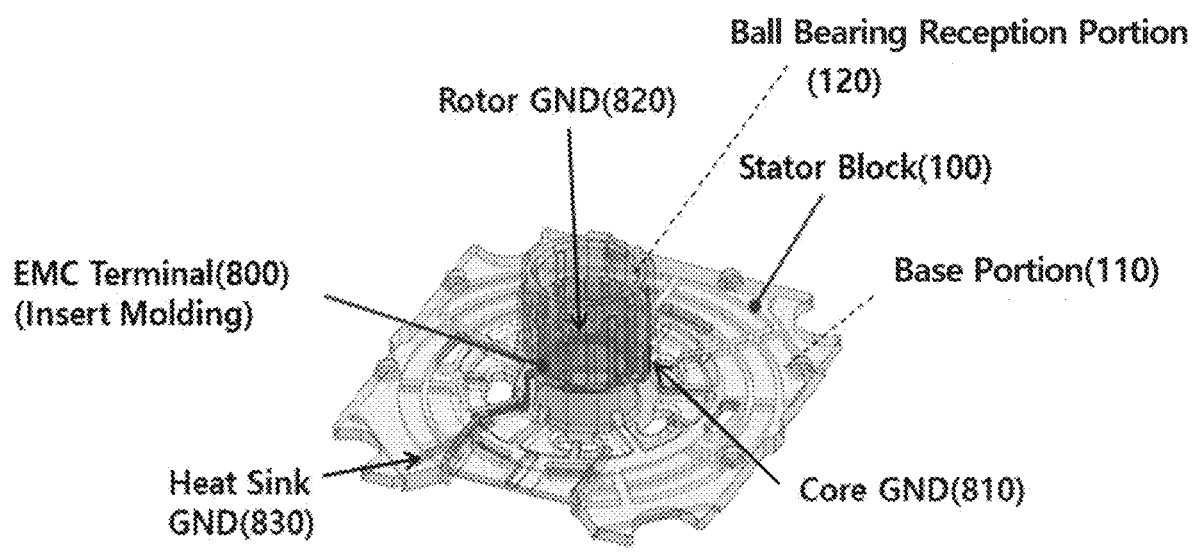
FIG. 1 is a perspective view of a stator block to which an EMC terminal ground for a BLDC motor according to the present invention is applied.
Figure 2:
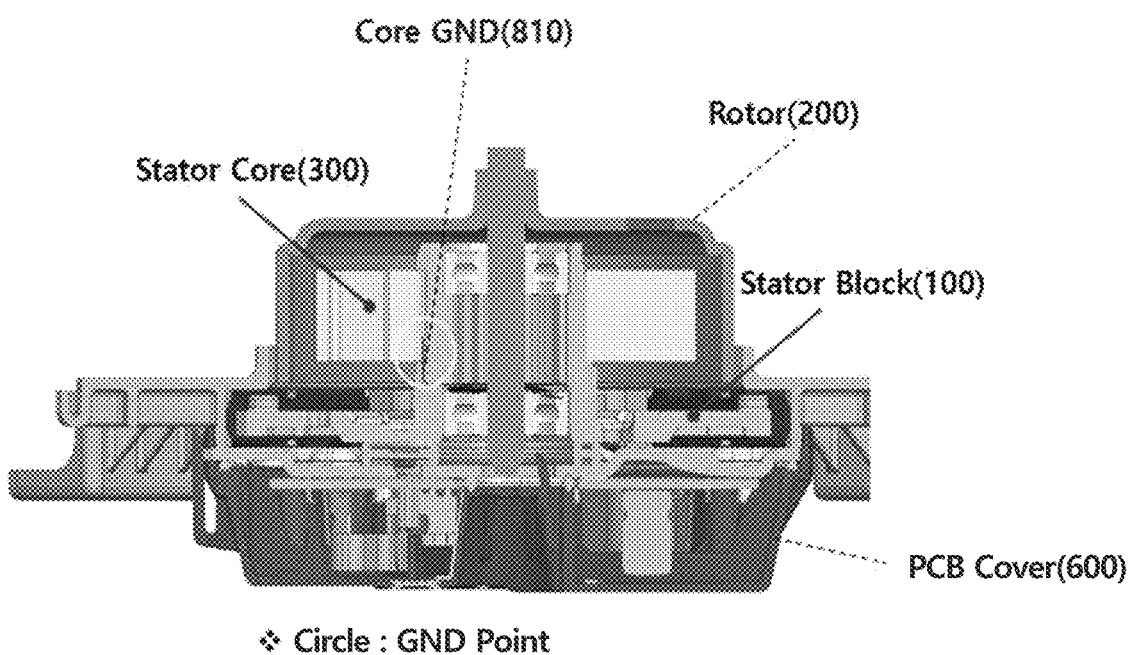
FIG. 2 is a left side sectional view of an embodiment to which an EMC terminal ground for a BLDC motor according to the present invention is applied.
Figure 3:
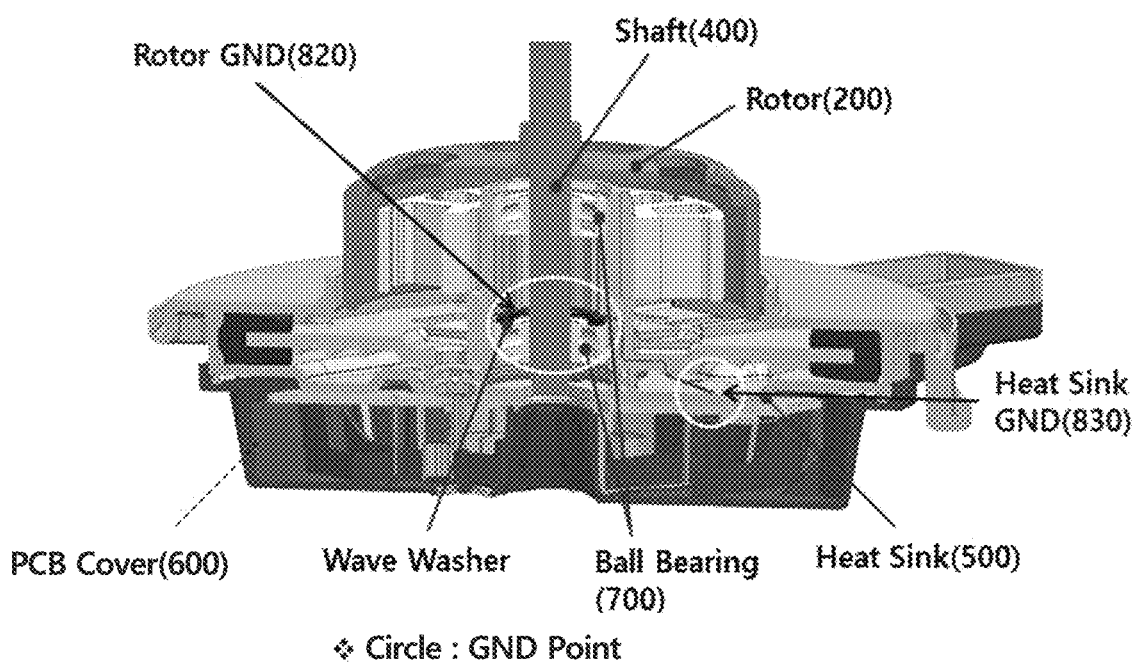
FIG. 3 is a right side sectional view of the embodiment to which the EMC terminal ground for a BLDC motor according to the present invention is applied.
Figure 4:
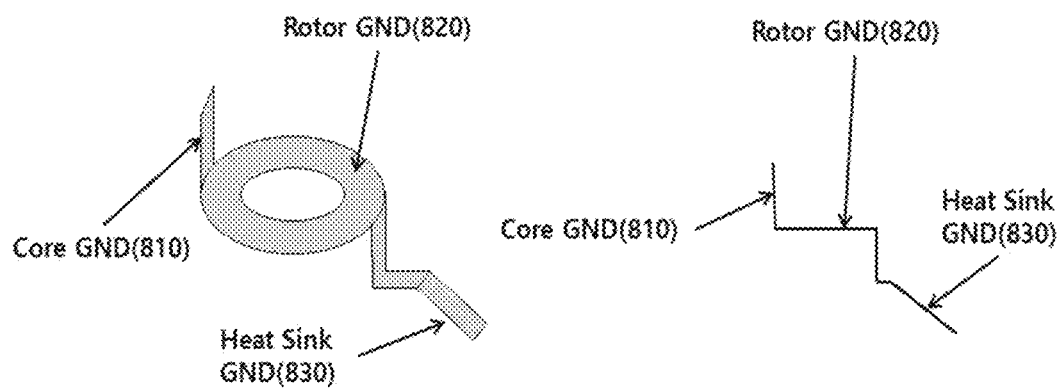
FIG. 4 shows perspective and side views of an embodiment of an EMC terminal ground for a BLDC motor according to the present invention.

FIG. 1 is a perspective view of a stator block to which an EMC terminal ground for a BLDC motor according to the present invention is applied, FIG. 2 is a left side sectional view of an embodiment to which an EMC terminal ground for a BLDC motor according to the present invention is applied, FIG. 3 is a right side sectional view of the embodiment to which the EMC terminal ground for a BLDC motor according to the present invention is applied, and FIG. 4 shows perspective and side views of an embodiment of an EMC terminal ground for a BLDC motor according to the present invention.

Referring to the FIGS. 1 to 4, an EMC terminal ground for a BLDC motor according to the present invention includes: a metal ground (GND) 800 configured to be applied to the BLDC motor. The BLDC motor includes: a stator block 100 configured to include a base portion 110 and a ball bearing reception portion 120; a rotor 200 configured to be coupled to the stator block 100 and to be rotated, and equipped with a permanent magnet therein; a stator core 300 located inside the rotor 200, and configured such that a coil is wound and current flows therethrough; a shaft 400 configured to pass through the centers of the rotor 200 and the stator core 300 and to transfer rotation power; a heat sink 500 installed at the lower end of the stator block 100, and configured to dissipate heat; a PCB cover 600 configured to cover and protect the lower end portion of the heat sink 500; and a pair of ball bearings 700 disposed in upper and lower portions at intervals between the ball bearing reception portion 120 and the shaft 400, and configured to support the shaft 400. The metal ground 800 grounds: the stator core 300; the rotor 200; and the heat sink 500.

More specifically, referring to FIGS. 1 to 3, it can be seen that the EMC terminal ground for a BLDC motor according to the present invention is insert-molded and extends through the insides of the ball bearing reception portion 120 and base portion 110 of the stator block 100. The shaft 400 passes through the rotor 200, the stator core 300, and the ball bearing reception portion 120. A wave washer configured to distribute pressure is disposed at the upper end of the lower ball bearing 700, and thus grounding to a rotor ground 820 is performed via the wave washer, thereby minimizing RF energy (noise).

Furthermore, the stator core 300 located inside the rotor 200 is grounded to a core ground 810 on the side surface of the ball bearing reception portion 120. The heat sink 500 disposed at the lower end of the stator block 100 and configured to dissipate heat is grounded to a heat sink ground 830, including a thin-plate vertical portion coupled to the core ground 810 vertically below the core ground 810 and a thin-plate inclined portion inclined downward from the lower end of the vertical portion. Accordingly, RF energy can be minimized.

Referring to FIG. 4, there is shown an embodiment of the EMC terminal ground for a BLDC motor according to the present invention, which is insert-molded and inserted into the stator block 100. In greater detail, the core ground 810 is drawn through the side surface of the ball bearing reception portion 120, the rotor ground 820 is located inside the ball bearing reception portion 120, and the heat sink ground 830 is drawn through the base portion 110 of the stator block 100.

In other words, the shaft 400, the rotor 200, the ball bearing 700, the wave washer, and the heat sink 500 are grounded to the core ground 810, the rotor ground 820, and the heat sink ground 830, thereby minimizing RF energy.

Although the above-described embodiments of the EMC terminal ground for a BLDC motor according to the present invention have been described with reference to the accompanying drawings in order to help to facilitate an understanding of the present invention as examples, it will be apparent to a person having ordinary knowledge in the art to which the present invention pertains that various modifications and alterations may be made without departing from the scope of the present invention based on the foregoing description given above.

DESCRIPTION OF REFERENCE NUMERALS

100: stator block
200: rotor
300: stator core
400: shaft
500: heat sink
600: PCB cover
700: ball bearing
800: metal ground

What is claimed is:

1. An electromagnetic compatibility (EMC) terminal ground for a brushless direct current (BLDC) motor, the EMC terminal ground comprising a metal ground (800) configured to be applied to the BLDC motor, the BLDC motor comprising:
   a stator block (100) configured to include a base portion (110) and a ball bearing reception portion (120);
   a rotor (200) configured to be coupled to the stator block (100) and to be rotated;
   a stator core (300) located inside the rotor (200);
   a shaft (400) configured to pass through centers of the rotor (200) and the stator core (300) and to transfer rotation power;
   a heat sink (500) installed at a lower end of the stator block (100), and configured to dissipate heat; and
   a PCB cover (600) configured to cover and protect the lower end portion of the heat sink 500; and
   a pair of ball bearings (700) disposed at intervals on upper and lower sides between the ball bearing reception portion (120) and the shaft (400);
   wherein the metal ground (800) grounds:
   the stator core (300);
   the rotor (200); and
   the heat sink (500), and
   wherein the metal ground (800) comprises a rotor ground (820) located inside the ball bearing reception portion (120) and configured to ground the rotor (200).

2. The EMC terminal ground of claim 1, wherein the metal ground (800) further comprises:
   a core ground (810) located on an outside surface of the ball bearing reception portion (120), and configured to ground the stator core (300); and
   a heat sink ground (830) located at a lower end of the stator block (100), and configured to ground the heat sink (500).

3. The EMC terminal ground of claim 2, wherein the heat sink ground (830) comprises: a thin-plate vertical portion coupled to the core ground (810) vertically below the core ground (810); and a thin-plate inclined portion inclined downward from a lower end of the vertical portion.

4. The EMC terminal ground of claim 2, wherein the core ground (810) is formed as a thin-plate vertical portion that extends vertically upward from the rotor ground (820).

5. The EMC terminal ground of claim 1, further comprising a wave washer disposed at an upper end of a lower ball bearing among the pair of ball bearings (700),
   wherein the rotor (200) is grounded to the rotor ground (820) via the wave washer.

* * * * *